United States Patent [19]
Priefert

[11] 3,712,493
[45] Jan. 23, 1973

[54] IRRIGATION PIPE TRAILER
[76] Inventor: Erwin E. Priefert, R.F.D. No. 1, Belvidere, Nebr. 68315
[22] Filed: Sept. 10, 1970
[21] Appl. No.: 70,956

[52] U.S. Cl.................................214/515, 280/402
[51] Int. Cl. .................................................B60p 1/64
[58] Field of Search............214/515; 296/3; 280/402

[56] References Cited

UNITED STATES PATENTS

| 3,419,282 | 12/1968 | Toews | 214/1 P X |
| 58,108 | 9/1866 | Landis | 296/3 |
| 1,122,686 | 12/1914 | Clark et al. | 214/515 |
| 2,665,938 | 1/1954 | McCrossen | 214/515 |
| 2,812,873 | 11/1957 | Coleman | 214/515 |

Primary Examiner—Albert J. Makay
Assistant Examiner—John Mannix
Attorney—Clarence A. O'Brien and Harvey B. Jacobson

[57] ABSTRACT

A trailer adapted to be towed by a towing vehicle such as a farm tractor and including a pipe rack and a two-wheeled carrier detachably interconnected to enable the rack to be used for storage purposes as well as transport of the pipe. The rack and carrier are releasably interconnected and include a turntable construction to enable the rack to rotate in relation to the carrier about generally a vertical axis for reversing the irrigation pipe on the rack. The carrier includes vertically adjustable supporting wheels to enable attachment and detachment of the carrier and also raising and lowering of the carrier to raise and lower the rack when engaged therewith.

9 Claims, 7 Drawing Figures

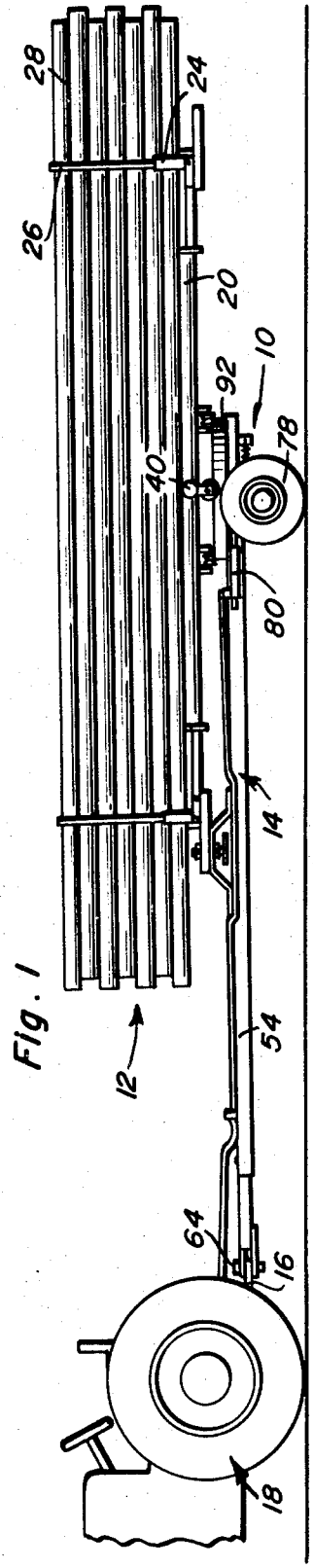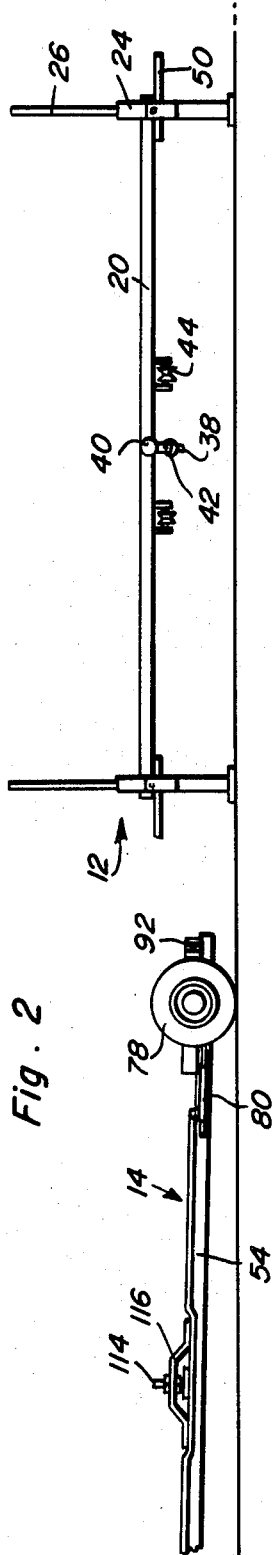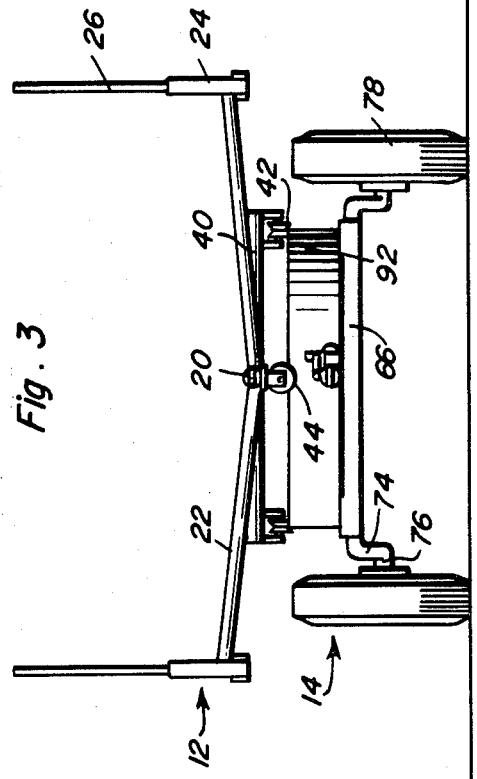
Erwin E. Priefert
INVENTOR.

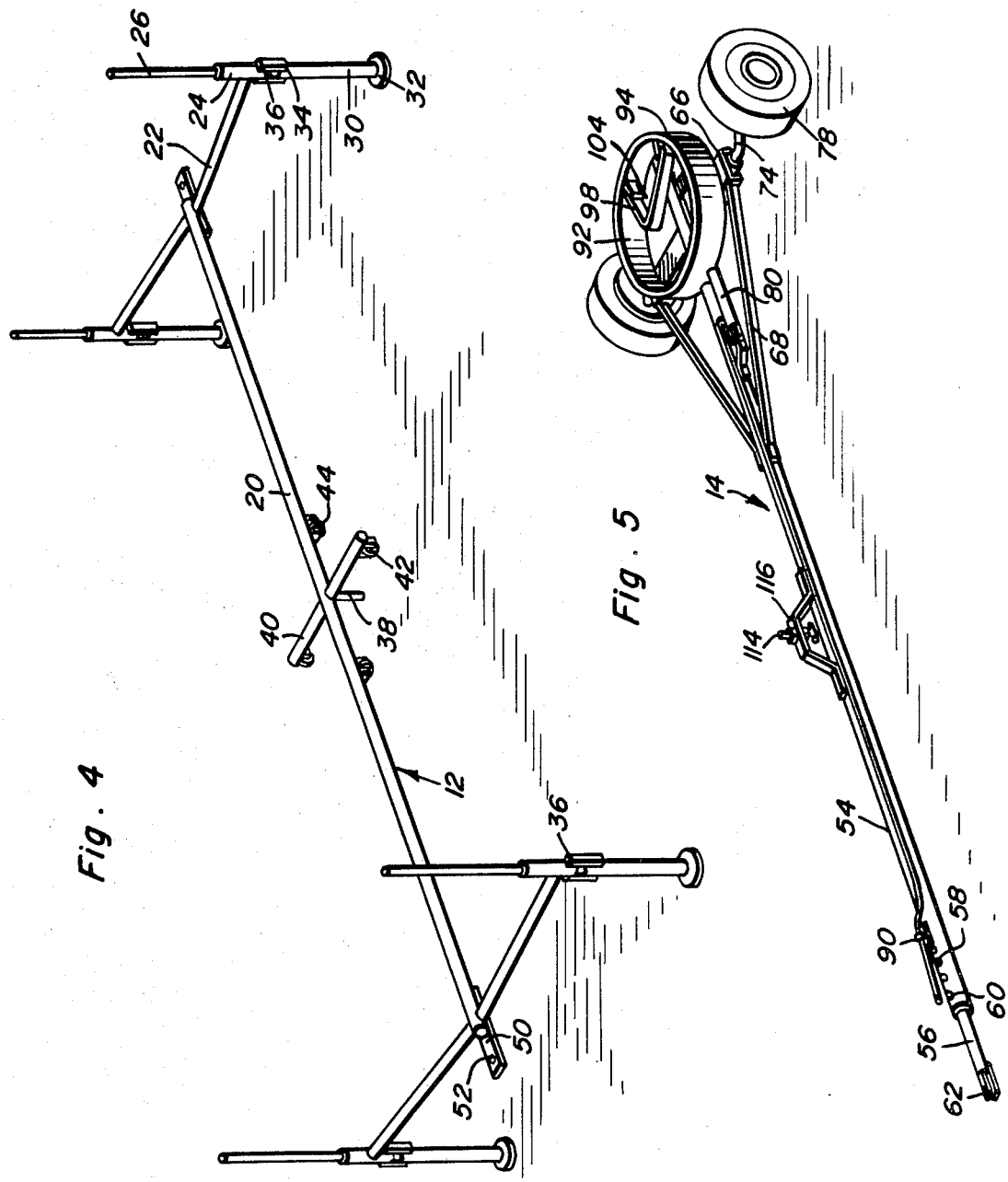

Erwin E. Priefert
INVENTOR.

BY Clarence A. O'Brien
and Harvey B. Jacobson
Attorneys

IRRIGATION PIPE TRAILER

BACKGROUND OF THE INVENTION

1. Field Of the Invention

The present invention generally relates to an apparatus in the form of a rack on which irrigation pipe sections or lengths may be positioned for storage or transport together with a two-wheeled carrier adapted to be connected to a towing vehicle and including elevatable wheels and a turntable structure as well as a structure for detachably connecting the rack thereto to enable the rack to be transported and stored and to enable the rack with pipe thereon to be rotated to reverse direction of the irrigation pipe on the carrier.

2. Description Of the Prior Art

Various load carrying bodies have been provided for vehicles which can be detached from the vehicle when used as temporary storage devices. For example, U.S. Pat. No. 3,119,503 discloses a vehicle having a set-off body. Other vehicles have elevatable wheels to facilitate loading of the vehicle by lowering at least one end thereof. For example, U.S. Pat. No. 3,039,633 shows such an arrangement and U.S. Pat. No. 3,288,315 discloses a trailer having elevatable wheels to enable the trailer to be lowered while in a horizontal plane or one end thereof tilted downwardly. However, such previously patented devices are not adapted for use with irrigation pipe in view of particular problems which exist in connection with present procedures employed in irrigation of land areas.

Present practices in irrigating land areas involves the use of a temporarily installed pipeline constructed of a plurality of elongated pipe sections which are detachably interconnected at their ends by some type of connecting structure. Usually, the irrigation pipeline is not left in the field during periods of non-use, such as during the winter, and is only installed after a crop has been planted or when natural rainfall is inadequate for supplying sufficient moisture to support growth of the crop. Usually, the irrigation pipe sections are stored in a pile in a farmyard or the like and when it is desired to utilize the pipe sections, they are individually and manually loaded onto a truck or wagon-type vehicle, conveyed to the point of use and then unloaded and assembled. Then it is desired to remove the irrigation pipeline, the procedure is reversed. As will be appreciated, a significant amount of manual labor is required in manually loading and unloading the pipe sections onto the conveying vehicle or off of the conveying vehicle and frequently, when the irrigation pipe sections are stored in a storage pile, they are subject to damage and sometimes dirt, trash and the like will become lodged in the pipe sections especially those laying on the ground.

SUMMARY OF THE INVENTION

An object of the invention is to provide an irrigation pipe trailer which includes two separable components, namely, a supporting framework or rack for a plurality of irrigation pipe sections and a carrier or hauler in the form of a two-wheeled vehicle adapted to be connected with a towing vehicle such as a farm tractor and detachably connected to the rack and including a turntable structure when combined with the rack to enable the rack and the pipe sections thereon to be reversed as to direction.

A significant result of the present invention is the substantial reduction in manual labor required in handling, storing and transporting irrigation pipe. The irrigation pipe sections are stored in the pipe rack in elevated position in relation to the ground surface and when it is necessary to transport the stored pipe sections to a field, the two-wheeled carrier is merely inserted under the rack and the carrier elevated to lift the rack off of the ground surface after which it is conditioned for over-the-road transport, the assembly is towed to the point of use and the irrigation pipe unloaded from the rack. If the pipe sections need to be reversed in view of the male and female ends normally provided thereon, the turntable structure may be employed to reverse the entire stack of pipe sections. After the irrigation pipe has been used and it is to be removed from the land area being irrigated, the pipe rack is again towed to the field being irrigated and the pipe sections are loaded onto the rack as they are disconnected from each other and the loaded rack then towed to a storage area and conditioned for permanent storage after which the rack is lowered and the two-wheeled carrier or hauler removed and employed with other similar racks. Thus, by employing a plurality of the racks and a single carrier, the bulky irrigation pipe sections may be effectively stored, transported and reversed as to direction in a quick and efficient manner thus effectively shortening the time required for loading or unloading by picking up an entire stack of pipe sections rather than one pipe section at a time.

A further important object of the invention is to provide a transporting and handling apparatus for irrigation pipe sections which is simple in construction, dependable and long lasting, effective for its particular purposes and relatively inexpensive to manufacture and maintain.

DESCRIPTION OF THE DRAWINGS

FIG. 1 is a side elevational view of the irrigation pipe trailer of the present invention illustrating the manner in which it is associated with a farm tractor for over-the-road movement.

FIG. 2 is a side elevational view of the rack and two-wheeled carrier illustrating the rack in stored condition and the carrier lowered for movement under the rack for engagement or disengagement in relation thereto.

FIG. 3 is a rear elevational view of the trailer.

FIG. 4 is a perspective view of the storage rack.

FIG. 5 is a perspective view of the two-wheeled carrier.

DESCRIPTION OF THE PREFERRED EMBODIMENT

Figure 6:
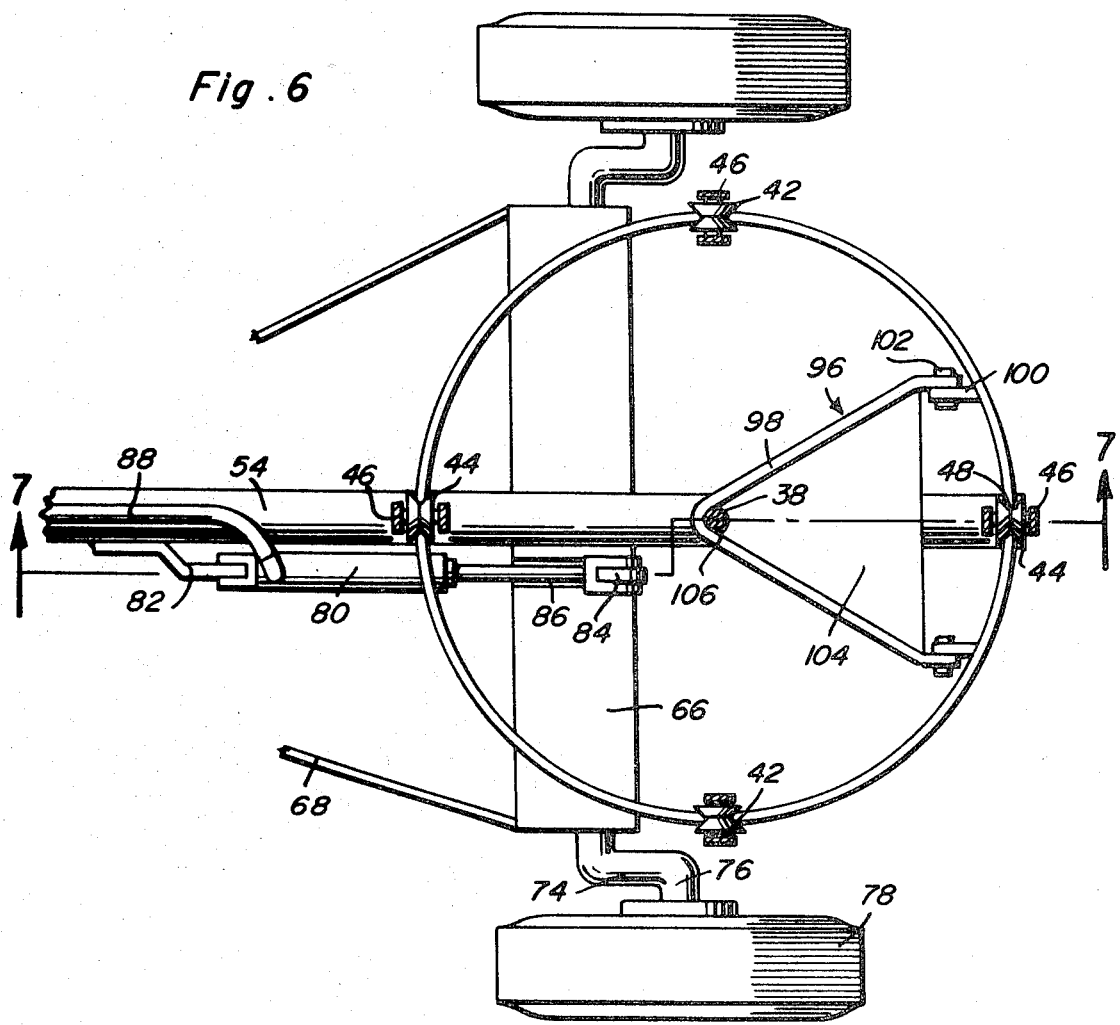
FIG. 6 is a plan sectional view, on an enlarged scale, illustrating the turntable structure on the two-wheeled carrier and the associated rollers on the rack.

The irrigation pipe trailer of the present invention is generally designated by the numeral 10 and includes a pipe supporting framework or rack 12 and a two-wheeled carrier 14 which is adapted to be connected to the drawbar 16 of a farm tractor 18 or other suitable towing vehicle in a conventional manner in which the towing vehicle is provided with a hydraulic pressure system such as is conventionally found on farm tractors.

Referring to FIG. 4, the rack 12 is illustrated in its stored condition and includes an elongated longitudinal frame member 20 which may conveniently be in the form of a tubular pipe. Attached rigidly to each end of the longitudinal member 20 is a transverse frame member 22 which as illustrated in FIG. 3 has the outer end portions disposed slightly above the longitudinal frame member 20. The transverse end members 22 may also be in the form of tubular pipes welded to opposite sides of the frame member 20 and disposed in slightly upwardly inclined relation thereto. At the outer end of each transverse end frame member 22 there is provided a vertically disposed tubular sleeve 24 receiving an upstanding pipe retaining stake 26 which also may be in the form of a tubular pipe removably telescoped into the sleeve 24 which is in the form of a stake socket or pocket. The pipe retaining stakes 26 are removable to facilitate loading and unloading of a plurality of irrigation pipe sections 28 onto the rack 12. The irrigation pipe sections have male and female ends and are alternately positioned on the rack when loaded so that when unloaded, the irrigation pipe sections will be properly oriented in relation to each other for quick connection to form a pipe line. By removing the stakes 26 on one side of the rack, the pipe sections may be more expeditiously loaded and unloaded in relation to the rack 12.

For supporting the rack 12 in stored condition, each tubular sleeve or socket 24 is provided with a depending supporting leg 30 having a plate or foot 32 affixed to the lower end thereof such as be welding or the like and the upper end of the leg 30 is pivotally supported from the lower end of the sleeve or socket 24 by a pair of lugs 34 rigidly affixed to opposite sides of the leg 30 and straddling the lower end of the sleeve 24 and pivotally attached thereto by suitable pivot bolt 36. The pivot bolt 36 is disposed transverse of the rack so that the legs 30 may swing from a vertical position as illustrated in FIG. 4 to a horizontal position generally in alignment with the frame member 20 as illustrated in FIG. 1 so that the rack may be self supporting when in stored position as illustrated in FIG. 4 or capable of over-the-road movement when the legs are in collapsed position illustrated in FIG. 1. Any suitable lock mechanism may be provided for securely locking the legs in their extended or retracted position or the pivot bolt may be merely tightened slightly to frictionally secure the legs in either of their two positions.

Figure 7:
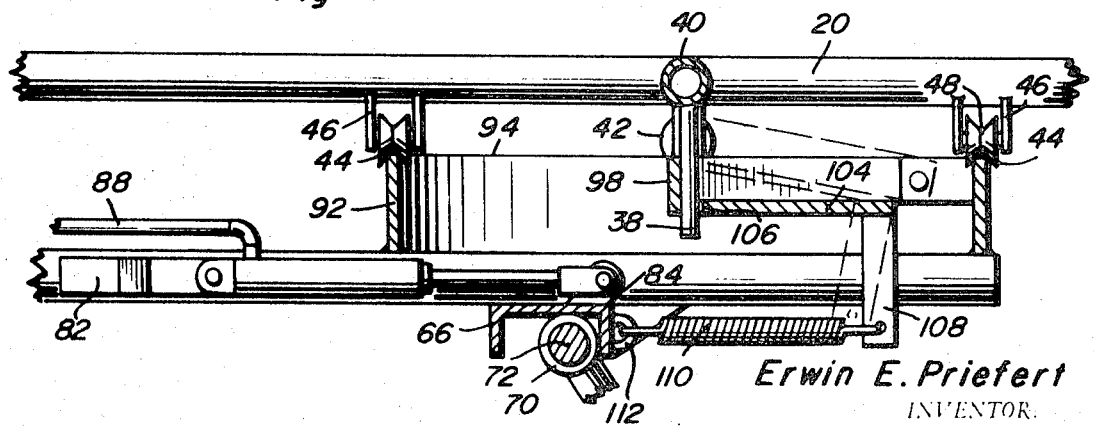
FIG. 7 is a vertical sectional view taken substantially upon a plane passing along section line 7—7 of FIG. 6 illustrating further structural details of the two-wheeled carrier and turntable structure on the carrier and on the rack.

Centrally of the longitudinal frame member 20, there is provided a depending locating pin 38 in the form of a short rod or pipe which extends downwardly in a perpendicular relation to the frame member 20. A relatively short transverse frame member 40 is attached to the center of the longitudinal frame member 20 and extends laterally from opposite sides thereof and is generally in the same horizontal plane as the longitudinal frame member 20 and also may be in the form of short pipe sections welded to the frame member 20. Mounted on the two outer ends of the transverse frame member 40 are rollers 42 which are disposed downwardly and are in horizontal alignment with a pair of rollers 44 on the longitudinal frame member 20 with the rollers 42 and 44 being disposed on the periphery of a circle having a center defined by the vertical pin 38. All of the rollers 42 and 44 are oriented in the same horizontal plane and rotate about axes intersecting the pin 38. As illustrated in FIGS. 6 and 7, each of the rollers 42 and 44 is supported by bracket lugs 46 welded to the respective frame members 20 and 40 and also, each of the rollers has a substantially V-shaped periphery with the center 48 having the smallest diameter.

Also, the rack 12 includes a projecting connecting plate 50 at each end thereof which forms an axial extension at each end of the frame member 20 and each plate 50 is a relatively narrow member that may be welded to the frame member 20 and the axial outer end of each plate 50 is provided with an aperture 52 by which the rack may be connected to the two-wheeled carrier with the longitudinal axis of the frame member 20 aligned with the direction of travel of the two-wheeled carrier 14 in a manner defined hereinafter.

The two-wheeled carrier 14 includes an elongated longitudinal central frame member 54 conveniently in the form of a rigid pipe. The forward end of the rigid pipe is provided with a telescopic tongue 56 secured in longitudinal adjustable position by a bolt 58 extending through one of a plurality of longitudinally spaced apertures 60 in the longitudinal frame 54. The forward end of the tongue 56 is provided with a conventional coupling 62 in the form of a clevis or the like receiving a pin 64 for detachably and articulately connecting the two-wheeled carrier 14 to the drawbar 16 of the tractor 18.

Adjacent the rear of the longitudinal frame 54, a transverse frame member 66 is provided in perpendicular relation thereto and in underlying relation thereto. The transverse frame member 66 is in the form of a downwardly opening channel-shaped member rigidly fixed to the longitudinal member 54 as by welding or the like thus forming a rigid frame structure. Brace members 68 are connected to each side of the longitudinal frame member 54 forwardly of the transverse frame member 66 and extend rearwardly and outwardly and are rigidly affixed to the transverse frame member 66 adjacent the outer ends thereof thus further rigidifying the frame structure.

Attached to the underside of the inverted channel-shaped transverse frame member 66 is a pair of cylindrical bearing sleeves 70 adjacent each end of the frame member 66 which are secured to the frame member 66 as by welding or the like and the bearing sleeves may be split bearings or any other suitable type of conventional bearing structures for receiving an elongated axle 72 having an offset arm 74 at each end thereof. Each offset arm supports a stub axle 76 thereon which rotatably journals a supporting wheel 78 which may include the usual pneumatic tire and the like conventionally found on various farm machinery. The offset arms 74 provide for vertical swinging movement of the wheels 78 when the axle 72 is oscillated about an axis extending transversely of the frame 66 thereby raising and lowering the frame 66 and the two-wheeled trailer 54 in a manner well known in various types of farm machinery.

For oscillating the axle 72, a hydraulically operated piston and cylinder assembly or ram 80 is provided with one end thereof connected to a bracket 82 fixed to the longitudinal frame member 54 adjacent the transverse frame 66. The other end of the piston and cylinder assembly 80 is attached to an upstanding arm or lug 84 rigidly fixed to a central portion of the axle 72 and projecting upwardly through a slot 86 formed in the frame member 66 whereby extension of the piston and cylinder assembly 80 will cause the piston rod to extend outwardly and rock the offset arms 74 downwardly thus elevating the two-wheeled carrier whereas retraction of the piston and cylinder assembly 80 will permit lowering of the two-wheeled carrier. A hydraulic conduit 88 is connected with the front end of the single acting piston and cylinder assembly for extension and retraction thereof and the conduit 88 extends forwardly along the frame member 54 and may be provided with brackets, couplings or the like such as the bracket 90 for retaining the conduit or hose in position. The hose or conduit 88 is connected with the hydraulic system of the tractor 18 and a suitable control valve is provided for admitting and exhausting hydraulic pressure in relation to the piston and cylinder assembly 80 to enable raising and lowering of the transverse frame 66.

Mounted rigidly on the upper surface of the rear portion of the longitudinal frame member 54 is a cylindrical turntable member 92 having a circular upper edge 94 having the same diameter as the circle defining the centers of the rollers 42 and 44 so that the V-shaped rollers 42 and 44 will be engaged with and rollingly supported on the upper edge 94 of the cylindrical member 92 which together with the rollers form a turntable to enable rotation of the rack 12 in relation to the carrier 14.

When backing the load carrier under the rack for assembly of the carrier with the rack, the depending pin 38 serves as a pilot pin for engaging a guide structure generally designated by reference numeral 96 and which includes a V-shaped guide member 98 having the legs thereof pivotally attached to a pair of lugs 100 mounted on the inner surface of the cylindrical member 92 adjacent the upper edge thereof with pivot pins or bolts 102 connecting the legs of the V-shaped guide 98 to the cylindrical member 92 for pivotal movement about a horizontal axis along a chord of the circle defined by the cylindrical member 92. The bottom end of the V-shaped guide 98 is closed by a plate 104 conforming in shape and configuration to the interior dimensions of the V-shaped guide 98 with an aperture 106 being provided in the plate at the apex of the V-shaped guide 98 for receiving the pilot pin 38 when the carrier and rack are assembled.

The edge of the plate 104 adjacent the pivot axis defined by the bolt 102 is provided with a depending arm 108 having a forwardly extending spring 110 attached thereto having its forward end attached to an anchor loop 112 on the transverse frame member 66 thus biasing the V-shaped guide member 96 upwardly towards the dotted line position illustrated in FIG. 7 so that the upper edges of the V-shaped guide 98 project above the upper edge of the cylindrical turntable member 92. Thus as the lowered carrier is maneuvered into underlying relation to the central portion of the rack 12, the converging surfaces of the V-shaped guide 98 will engage the pilot pin 38 and cause the alignment of the pilot pin 38 with the apex of the V-shaped guide 98 when the carrier is moved toward the rack so that the guide pin 38 can move along the converging inner surfaces of one of the legs of the V-shaped guide 98. When the guide pin 38 is in the apex of the V-shaped guide 98 and received in or in alignment with the aperture 106, the hydraulic piston and cylinder 80 can then be actuated and the upper edge of the turntable 92 will be engaged with the rollers 42 and 44 since the guide pin 38 is in the center of the circle defined by the rollers and the aperture 106 is in the center of the circle defined by the cylindrical member 92. In this condition, the wheels 78 are lowered which first engages the upper edge 94 of the cylindrical member 92 with the rollers and then elevates the rack so that the legs 30 can be collapsed and the rack rotated with the longitudinal member 20 aligned with the longitudinal frame member 54 of the carrier 14 so that the plate 50 will align with a securing pin or bolt 114 carried by a U-shaped bracket 116 mounted on the upper surface of the longitudinal frame member 54 so that either of the plates 50 may be moved to the forwardmost position in which event the aperture 52 therein will be aligned with the fastening pin or bolt 114 which is employed to securely retain the rack in longitudinal position on the carrier so that the trailer is then ready for over-the-road movement.

The pivotal guide structure 96 which is hinged to tilt up and to guide the pilot pin on the rack into the hole eliminates the necessity of a critical height adjustment being made in the height of the carrier when it is backed under the rack. Thus, the carrier may be lowered to its lowest position and the guide structure still engage the pilot pin and guide the carrier into proper alignment with an assembly with the rack.

This structure provides an irrigation pipe carrier or hauler in which the rack which holds the irrigation pipe can be disconnected and by using the adjustable legs on the rack, the rack may be set on the ground and the two-wheeled carrier removed for use on other racks of pipe or for other jobs which may need an undercarriage of similar construction. Thus, a person employing an irrigation assembly may use as many racks as necessary to store his pipe. This device may be employed to mechanically transfer irrigation pipe from a storage area to the field or vice versa, reverse direction of pipe, shorten the time of loading or unloading by picking up an entire stack rather than one pipe at a time and is useful not only for a farmer using the irrigation system but also a dealer which would enable aluminum irrigation pipe to be stored at the dealer's place of business and easily transported for delivery. By using the rack, the individual irrigation pipes do not have to be unloaded at the farm yard in the fall of the year when hauled in from the field to be stored. Rather, the rack is disconnected from the carrier and serves as a winter storage rack. The rack keeps the pipe off the ground and holds it compactly in a package form. Also, the rack prevents possible bending damage to the pipe which sometimes occurs due to wind causing movement of irrigation pipe when stacked on the ground. With the pipe stored on the rack, when it is needed in the field for the next irrigation season, it is only necessary to insert the carrier and haul out the complete rack or pipe thus eliminating the necessity of individually picking up the pipe from its storage pile and placing each pipe onto a vehicle. Thus, by providing one two-wheeled carrier and as many racks as are needed to hold all of the aluminum irrigation pipe being used, a person may expediently store, transfer and handle aluminum irrigation pipe.

While the rack has been disclosed with a central tubular frame member, and generally pipes or tubular members have been used in the construction thereof, it is pointed out that other structural components may be employed in constructing the rack or framework such as angle iron members, channels, I-beams and other shaped tubular members. Further, other framework structures may be provided such as a peripheral frame of rectangular configuration with the vertical sockets oriented at the corners thereof rather the H-shaped frame as illustrated. Also, the elevating mechanism may be shifted longitudinally of the carrier to provide a greater vertical dimension of movement of the turntable structure which may be oriented adjacent the rear end of the carrier. Also, other vertical adjustment mechanism may be employed in elevating and lowering the carrier.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A trailer for transporting and storing irrigation pipes comprising an undercarriage and a mountable and demountable pipe rack, said rack including a framework having vertical sockets thereon, and pipe retaining stakes disposed in the sockets for retaining a stack of irrigation pipe on the rack, and a plurality of retractable supporting legs on the rack for supporting the rack in elevated position above a supporting surface to enable the rack to be used for storing the pipe when not being used and enabling the undercarriage to be inserted under and removed from under the rack whereby the rack can be used to transport the irrigation pipe or store the irrigation pipe, said rack including a centrally disposed depending pin, a plurality of rollers mounted on said rack in circumferentially spaced relation about the pin with the rollers being rotatable on axes intersecting at the pin and oriented in a circular pattern having a center at the pin, said undercarriage including means supportingly engaging the rollers and guide means engaging the pin for aligning the rollers and the roller supporting means on the undercarriage thereby enabling the rack to be rotated in relation to the undercarriage.

2. The structure as defined in claim 1 wherein said undercarriage includes a two-wheeled carrier, means vertically adjusting the wheels in relation to the carrier for raising and lowering the roller supporting means on the undercarriage whereby the undercarriage may be inserted under the rack with the guide pin receiving means on the carrier aligning the roller supporting means on the undercarriage with the rollers on the rack after which the wheels on the carrier may be lowered thus elevating the rack and supporting the rack from the undercarriage to enable rotation of the rack and transport of the rack.

3. The structure as defined in claim 2 together with cooperating fastening means on the rack and undercarriage to secure the rack in predetermined angular relation to the undercarriage for over-the-road transport of the rack.

4. The structure as defined in claim 3 wherein said roller supporting means on the undercarriage includes a cylindrical member having a diameter substantially the same as the diameter of the circle defined by the rollers on the rack.

5. The structure as defined in claim 4 wherein said means on the undercarriage engaging the pin on the rack including a V-shaped guide member opening laterally of the cylindrical member and disposed interiorly thereof with the apex of the V-shaped guide member coinciding with the center of the cylindrical member, means mounting the V-shaped guide to the cylindrical member for pivotal movement from a position with the apex of the V-shaped member above the upper edge of the cylindrical member to a position in alignment wherewith, spring means biasing the V-shaped guide member with the apex above the upper edge of the cylindrical member to enable the guide member to engage the depending pin on the rack when the undercarriage is moved under the rack for aligning the cylindrical member with the rollers.

6. The structure as defined in claim 5 wherein said V-shaped guide member includes a plate closing the lower end thereof, said plate having an aperture therein coinciding with the apex of the V-shaped guide member for receiving the depending pin on the rack whereby the pin acts as a pivot axis for relative rotation between the rack and the carriage.

7. A vehicle for transporting elongated items comprising a rack for receiving a plurality of items, a wheeled undercarriage for supporting said rack, said rack including an elongated framework having upwardly opening sockets therein, retaining stakes removably disposed in said sockets for retaining a stack of elongated items on the rack, turntable means interconnecting the rack and undercarriage to enable the rack to rotate about substantially a vertical axis, means interconnecting the rack and undercarriage to releasably retain the elongated framework in predetermined angular position about the vertical axis, and means on said undercarriage for enabling elevational adjustment thereof, said turntable means including a plurality of roller means mounted on said rack in circumferentially spaced relation about a center point, circular support means mounted on said undercarriage for engaging the roller means, and an interconnecting pin centrally disposed in relation to the roller means and circular supporting means and defining a substantially vertical axis for relative rotation of the rack in relation to the undercarriage.

8. The structure as defined in claim 7 wherein said undercarriage includes a two-wheeled carrier, said means for enabling elevational adjustment of the undercarriage including means vertically adjusting the wheels in relation to the carrier for raising and lowering the circular supporting means on the undercarriage thereby raising and lowering the rack.

9. The structure as defined in claim 8 wherein said circular support means on the undercarriage includes a cylindrical member having a diameter substantially the same as the diameter of the circular pattern defined by the roller means on the rack, said means interconnecting the rack and undercarriage to releaseably retain the elongated framework in predetermined angular position about the vertical axis including cooperating fastening means on the rack and carrier to secure the rack in predetermined angular relation to the undercarriage for over the road transport of the rack.

* * * * *